(12) United States Patent
Forrest

(10) Patent No.: US 8,939,646 B2
(45) Date of Patent: Jan. 27, 2015

(54) SHAFT SUPPORT AND LUBRICATION ASSEMBLY

(71) Applicant: Ward Forrest, Edmonds, WA (US)

(72) Inventor: Ward Forrest, Edmonds, WA (US)

( * ) Notice: Subject to any disclaimer, the term of this patent is extended or adjusted under 35 U.S.C. 154(b) by 88 days.

(21) Appl. No.: 13/861,837

(22) Filed: Apr. 12, 2013

(65) Prior Publication Data

US 2014/0307990 A1    Oct. 16, 2014

(51) Int. Cl.
*F16C 33/74*    (2006.01)
*F16C 17/02*    (2006.01)

(52) U.S. Cl.
CPC .............. *F16C 17/022* (2013.01); *F16C 33/74* (2013.01)
USPC .......................................... 384/143; 384/295

(58) Field of Classification Search
USPC ............................ 384/16, 140, 143, 150, 295
See application file for complete search history.

(56) References Cited

U.S. PATENT DOCUMENTS

| | | | |
|---|---|---|---|
| 2,806,721 A * | 9/1957 | Fagg et al. ........................ | 384/16 |
| 3,439,376 A | 4/1969 | Nelson et al. | |
| 3,602,613 A * | 8/1971 | Gunther et al. ............... | 277/516 |
| 3,646,846 A | 3/1972 | Houghton et al. | |
| 3,820,860 A * | 6/1974 | Stone ............................. | 384/428 |
| 4,054,331 A | 10/1977 | Jamin | |
| 4,647,050 A * | 3/1987 | Johnson ......................... | 277/329 |
| 4,896,367 A * | 1/1990 | Newton et al. ................... | 384/16 |
| 5,090,087 A | 2/1992 | Hipple et al. | |
| 5,217,068 A | 6/1993 | Newton | |
| 5,225,262 A | 7/1993 | Leduc | |
| 5,267,533 A | 12/1993 | Smith | |
| 5,370,405 A | 12/1994 | Ueda | |
| 5,549,305 A | 8/1996 | Freund | |
| 5,636,688 A * | 6/1997 | Bassinger ...................... | 277/505 |
| 5,772,218 A * | 6/1998 | Burgess ........................ | 277/516 |
| 6,385,956 B1 | 5/2002 | Ottinger et al. | |
| 6,502,382 B1 | 1/2003 | Fujiwara et al. | |
| 6,575,122 B2 | 6/2003 | Hipple | |
| 6,644,007 B2 | 11/2003 | Fujiwara et al. | |
| 6,834,862 B2 * | 12/2004 | Wilkinson ..................... | 277/510 |
| 7,753,339 B2 | 7/2010 | Yuzawa et al. | |
| 8,814,432 B2 * | 8/2014 | Thoma et al. .................... | 384/16 |
| 2002/0155304 A1 | 10/2002 | Tanaka et al. | |
| 2007/0230846 A1 | 10/2007 | Tanaka et al. | |
| 2010/0291659 A1* | 11/2010 | Strickland ...................... | 435/262 |

* cited by examiner

*Primary Examiner* — Thomas R. Hannon
(74) *Attorney, Agent, or Firm* — Baker & Hostetler LLP

(57) ABSTRACT

A shaft support and lubrication system can include two vise bearings, a lantern ring, and two or more sets of packings. The vise bearings can be rigid cylinder tubes. The lantern ring can be a flexible cylindrical tube with one or more outer grooves on an outer diameter, one or more inner grooves on an inner diameter, and one or more through holes from either the outer diameter or the one or more outer grooves to either the inner diameter or the one or more inner grooves. When arranged coaxially and installed on a shaft, the shaft support and lubrication system provide physical stabilization and provide lubrication or cleaning solution to the shaft.

20 Claims, 5 Drawing Sheets

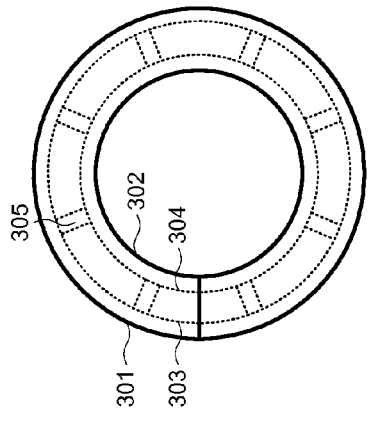
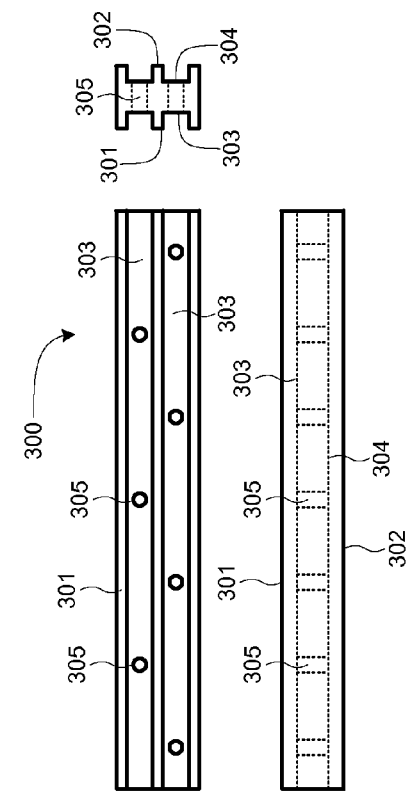
*Figure 3B*
*Figure 3A*
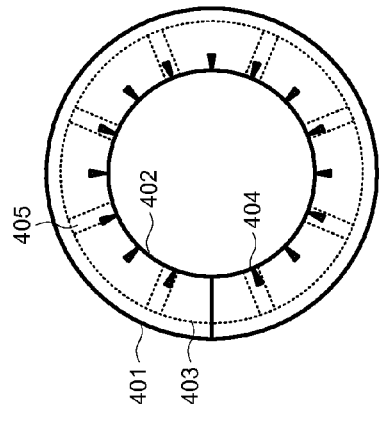
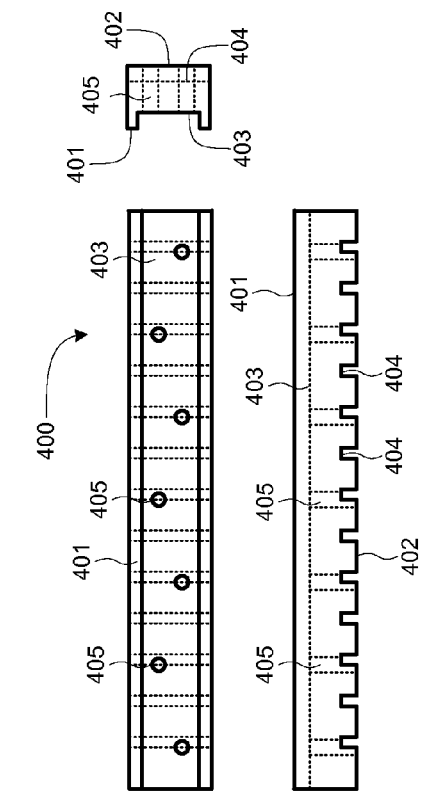
*Figure 4B*
*Figure 4A*

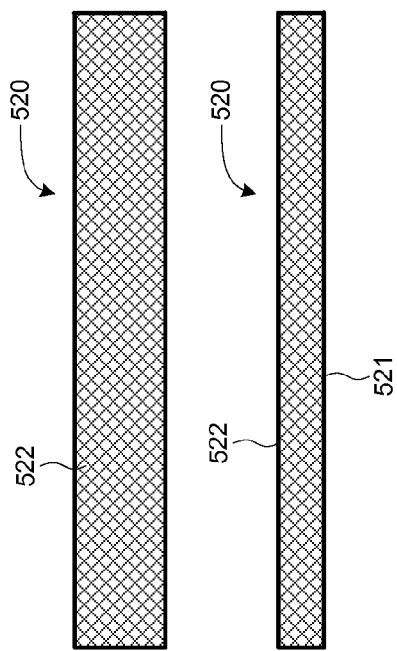
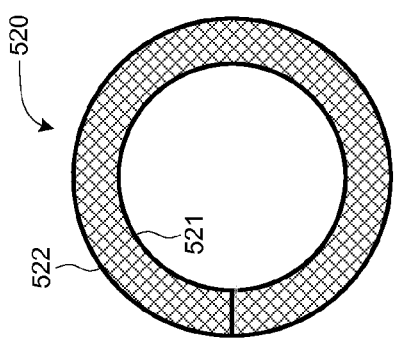
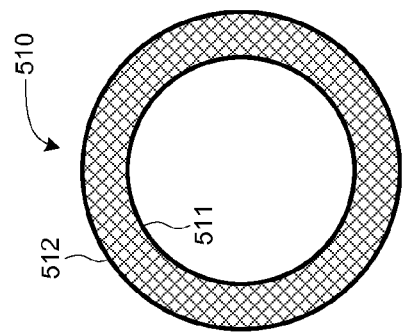

SHAFT SUPPORT AND LUBRICATION ASSEMBLY

BACKGROUND

Rotating shafts can be used in many applications. Shafts can be attached to engines, pumps, wheels, turbines, and in many other applications. Rotating shafts can become unstable during operation. Factors that may add to rotation shaft stability include the length of the shaft, the orientation of the shaft, the diameter of the shaft, the speed at which the shaft is rotated, and the like. Shaft stability can be increased by providing support for the rotating shaft. However, conventional solutions tend to wear rapidly, wear unevenly, and be difficult to repair.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

FIGS. 3A and 3B depict an embodiment of a lantern ring that can be used in a shaft support and lubrication system.

FIGS. 4A and 4B depict another embodiment of a lantern ring that can be used in a shaft support and lubrication system.

FIGS. 5A-5C depict embodiments of packings that can be used in a shaft support and lubrication system.

DETAILED DESCRIPTION OF ILLUSTRATIVE EMBODIMENTS

Figure 1A:
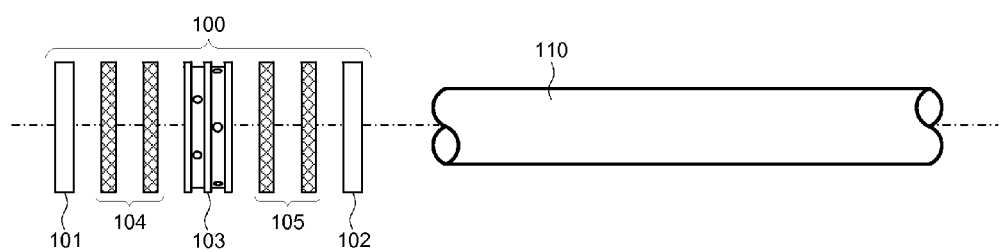
FIGS. 1A and 1B depict an example of a shaft support and lubrication system that can be installed on a shaft.

FIG. 1A depicts an example of a shaft support and lubrication system 100 that can be installed on a shaft 110. The shaft support and lubrication system 100 can include a first vice bearing 101 and a second vise bearing 102. Each of vise bearings 101 and 102 can be a rigid tube having a substantially cylindrical outer surface, a substantially cylindrical inner bore surface, a first annular end, and a second annular end. The diameter of the inner bore can be selected to be slightly larger than the diameter of a shaft and the diameter of the outer surface can be selected to be slightly smaller than a diameter of a seal cavity. The two vise bearings 101 and 102 can be spaced apart such that other components of the shaft support and lubrication system 100 can be located between the vise bearings 101 and 102.

The vise bearings 101 and 102 can be made of materials that can withstand high temperatures, such as bearing grade thermal plastic. For example, vise bearings 101 and 102 can be made of Polybenzimidazole (PBI) in a molded or fibrous form. PBI is a synthetic fiber with exceptional thermal and chemical stability; it has an extremely high melting point that also does not readily ignite. PBI fiber has been described as a manufactured fiber in which the fiber-forming substance is a long chain aromatic polymer having recurring imidazole groups as an integral part of the polymer chain.

The shaft support and lubrication system 100 can also include a lantern ring 103. The lantern ring 103 can be a flexible material having a substantially cylindrical outer surface with one or more outer grooves, a substantially cylindrical inner bore surface with one or more inner grooves, one or more through holes from at least an outer groove to an inner groove, a first annular end, and a second annular end. The through holes can allow for liquid, such as lubrication and/or cleaning liquid to pass from the outside of shaft support and lubrication system 100 to the shaft 110.

The shaft support and lubrication system 100 can also include one or more sets of packings 104 and 105. Each of sets of packings 104 and 105 can include one or more packings. Packings can be made of flax, jute, asbestos or synthetic, such as polytetraflouroethylene, fibers which are formed into yarns or strands and which are braided together about core strands. The result is typically a packing having a square cross-section and herringbone weave pattern extending in an axial direction along the packing; typical such packings are illustrated in U.S. Pat. No. 3,646,846.

One embodiment, the packings can be a "Braided High Temperature Packing Comprising a Core of Folded Flexible Graphite Sheet," such as that taught by U.S. Pat. No. 5,225,262 to Leduc issued on Jul. 6, 1993: "The braided packing of the invention is suitable for high temperature and high-pressure applications, with functional limits up to 1200° F. and 5,000 psi. The resilience and toughness of the packing is achieved through a flexible packing core of folded, reinforced square plait braided graphite tape overbraided with high strength and high-temperature resistant yarns. The resulting packing is rugged, non-hardening, nonmetal, non-stem scoring, and easily removable (e.g., from a packing gland) when it needs to be replaced. The high-temperature/high-pressure resistant packing of the invention has the additional advantage of not requiring the use of asbestos and yet retaining the high-temperature resistant properties of that product. The inner core of the packing can be preconsolidated to a density approaching the final density and therefore the final product can be live-loaded (e.g., into a valve stem packing gland), thus saving considerable time in the final adjustment of the gland." Additional and non-limiting examples of suitable packing materials are taught in U.S. Pat. No. 6,644,007 to Fujiwara et al. on Nov. 11, 2003; U.S. Pat. No. 6,502,382 to Fujiwara et al. on Jan. 7, 2003; and U.S. Pat. No. 6,385,956 to Ottinger, et al. on May 14, 2002. In another embodiment, the packings can be made of PBI. When used as a fiber to make up a packing, PBI can give the packings superior longevity and sealing capability over other materials. While PBI is one suitable constituent, it is not the only such suitable constituent of packings.

As shown in FIG. 1A, each of the components of the shaft support and lubrication system 100 can be arranged coaxially with shaft 110. The lantern ring 103 can be located between a first vise bearing 101 and a second vice bearing 102. One or more first packings 104 can be located between the first vise bearing 101 and the lantern ring 103. One or more second packings 105 can be located between the second vise bearing 102 and the lantern ring 103.

Figure 1B:
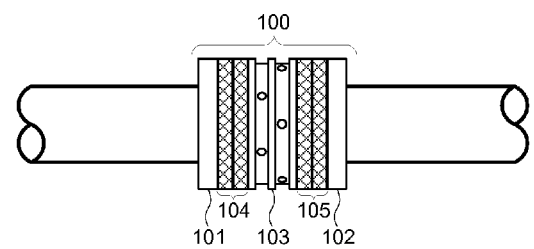

FIG. 1B depicts the components of the shaft support and lubrication system 100 installed around shaft 110. As depicted, the vise bearings 101 and 102 can be arranged to cause each of the components of the shaft support and lubrication system 100 to come into contact with its neighboring component or components. The vise bearings 101 and 102 can be configured as sleeve bearings. The vise bearings 101 and 102 can be spaced apart to provide support to the shaft 110 and to lend support to the entire shaft 110. The two vise bearings 101 and 102 can provide the equivalent of a single bearing that runs from an outer surface of the vise bearings 101 to an outer surface of the opposedly situated vise bearings 102 while preserving a space for the lantern ring 103 and the packings 104 and 105. If the center of downward force exerted by the shaft 110 is located between vise bearing 101 and vise bearing 102, each of the vise bearings 101 and 102 can support a portion of that force. If the center of downward force exerted by the shaft 110 is located outside of the space between vise bearing 101 and vise bearing 102, not only will the vise bearings 101 and 102 support the downward force of the shaft 110 but a torque will also be applied to vise bearings 101 and 102. In the latter case, the spaced apart configuration of the vise bearings 101 and 102 can resist the torque being situated further apart on the lever arm, thereby obtaining a mechanical advantage as situated in touching relation. The spaced apart relation reduces the risk that the torque will deflect the shaft 110 and, therefore, reduces the risk of compromising the sealing conformity of the packings 104 and 105. While a two bearing solution is described, these advantages are gained by, at least the outer two bearings 101 and 102 but might be enhanced by additional bearings at intervals throughout the shaft support and lubrication system 100.

Figure 2B:
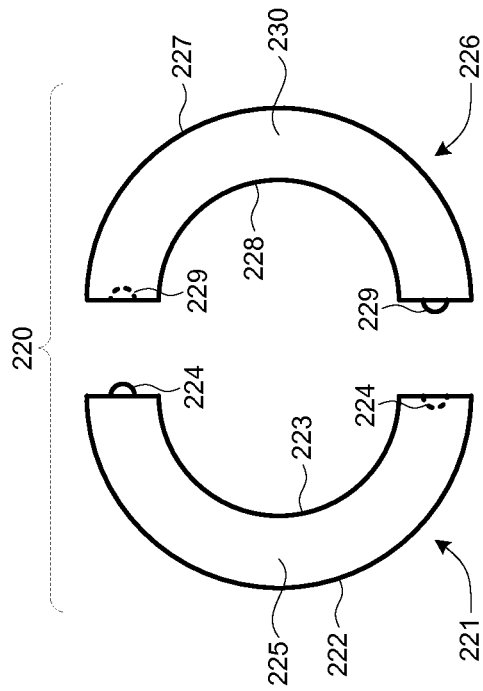
FIGS. 2A and 2B depict embodiments of vise bearings that can be used in a shaft support and lubrication system.
Figure 2A:
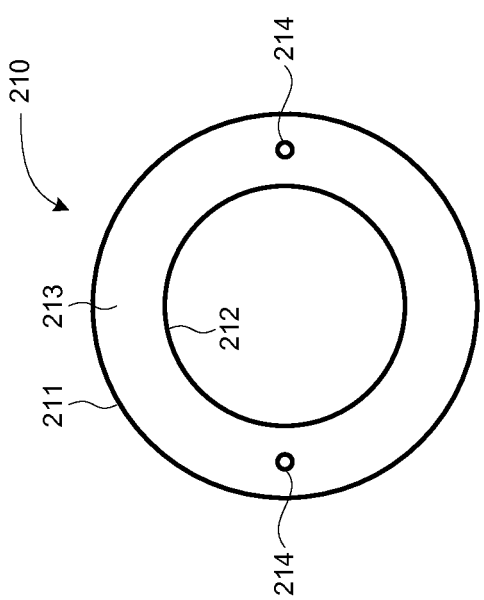

FIG. 2A depicts an embodiment of a vise bearing 210. Vise bearing 210 is a rigid tube with a substantially cylindrical outer surface 211 and a substantially cylindrical inner bore surface 212. The diameter of the inner bore surface 212 can be selected to be slightly larger than the diameter of a shaft and the diameter of the outer surface 212 can be selected to be slightly smaller than a diameter of a seal cavity. Vise bearing 210 can also have two annular ends; one annular end 213 is depicted in FIG. 2A and the other annular end is on the back side of vise bearing 210. Vise bearing 201 can optionally have one or more alignment holes 214 that are through holes from the one annular end 213 to the other annular end.

FIG. 2B depicts another embodiment of a vise bearing 220. Vise bearing 220 includes two semi-cylindrical halves 221 and 226 of a rigid tube. The halves 221 and 226 have substantially semi-cylindrical outer surfaces 222 and 227, and substantially semi-cylindrical inner bore surfaces 223 and 228. The diameter of the inner bore surfaces 223 and 228 can be selected to be slightly larger than the diameter of a shaft and the diameter of the outer surfaces 222 and 227 can be selected to be slightly smaller than a diameter of a seal cavity. Each of the halves 221 and 226 can have mating surfaces that mate with the other of the halves 221 and 226. In the embodiment depicted in FIG. 2B, the mating surfaces of halves 221 and 226 can optionally include centering elements 224 and 229, respectively. The centering elements 224 and 229 can be configured to keep the two halves 221 and 226 aligned. The two halves 221 and 226 can also include a first annular end 225 and 230 and a second annular end on the opposite side of the halves 221 and 226. In operation, the two halves 221 and 226 can be placed on either side of a shaft and inserted into a seal cavity. If the tolerances between the diameter of the outer surfaces 222 and 227 and the diameter of the seal cavity are sufficiently tight, the two halves will provides similar support to the operation of a cylindrical vise bearing, such as vise bearing 210.

FIGS. 3A and 3B depict an embodiment of a lantern ring 300. More specifically, FIG. 3A depicts top, side, and end views of a lantern ring 300 before being bent into a ring shape, and FIG. 3B depicts a side view of lantern ring 300 after being bent into a ring shape. Lantern ring 300 can be made of a resilient flexible material that will allow the lantern ring 300 to be bent from a straight arrangement, such as the one depicted in FIG. 3A, to a ring-shaped arrangement, such as the one depicted in FIG. 3B. The lantern ring 300 can have an outer surface 301 and an inner surface 302. The width between the outer surface 301 and the inner surface 302 may be selected such that, when the lantern ring 300 is bent into a cylindrical tube shape as depicted in FIG. 3B, the diameter of the inner surface 302 is slightly larger than the diameter of a shaft and the outer surface 301 is slightly smaller than a diameter of a seal cavity.

The outer surface 301 of lantern ring 300 can also include one or more outer grooves 303. The one or more outer grooves 303 can run substantially parallel to a length of the lantern ring 300, as depicted in FIG. 3A. The inner surface 302 can also include one or more inner grooves 304. The one or more inner grooves 304 can run substantially parallel to a length of the lantern ring 300, as depicted in FIG. 3A. The lantern ring 300 can also include one or more through holes 305. The one or more through holes 305 depicted in FIGS. 3A and 3B run from the one or more outer grooves 303 to the one or more inner grooves 304. The one or more through holes 305 could run from the outer surface 301 to the inner surface 302 if necessary. In operation on a rotating shaft, a liquid, such as a liquid lubricant or a liquid cleaning agent, can be added to the one or more outer grooves 303. The liquid can pass through the one or more through holes 305 into the one or more lower grooves 304 and onto the rotating shaft.

FIGS. 4A and 4B depict an embodiment of a lantern ring 400. More specifically, FIG. 4A depicts top, side, and end views of a lantern ring 400 before being bent into a ring shape, and FIG. 4B depicts a side view of lantern ring 400 after being bent into a ring shape. Lantern ring 400 can be made of a resilient flexible material that will allow the lantern ring 400 to be bent from a straight arrangement, such as the one depicted in FIG. 4A, to a ring-shaped arrangement, such as the one depicted in FIG. 4B. The lantern ring 400 can have an outer surface 401 and an inner surface 402. The width between the outer surface 401 and the inner surface 402 may be selected such that, when the lantern ring 400 is bent into a cylindrical tube shape as depicted in FIG. 4B, the diameter of the inner surface 402 is slightly larger than the diameter of a shaft and the outer surface 401 is slightly smaller than a diameter of a seal cavity.

The outer surface 401 of lantern ring 400 can also include one or more outer grooves 403. The one or more outer grooves 303 can run substantially parallel to a length of the lantern ring 400, as depicted in FIG. 4A. The inner surface 402 can also include one or more inner grooves 404. The one or more inner grooves 404 can run substantially perpendicular to a length of the lantern ring 400, as depicted in FIG. 4A. The one or more inner grooves 404 can be at any other angle with respect to the length of the lantern ring 400. The lantern ring 400 can also include one or more through holes 405. The one or more through holes 405 depicted in FIGS. 4A and 4B run from the one or more outer grooves 403 to either the one or more inner grooves 404 or the inner surface 402. The one or more through holes 405 could run from the outer surface 401 to the inner surface 402 if necessary. In operation on a rotating shaft, a liquid, such as a liquid lubricant or a liquid cleaning agent, can be added to the one or more outer grooves 403. The liquid can pass through the one or more through holes 405 into the one or more lower grooves 404 and onto the rotating shaft.

FIGS. 5A to 5C depict embodiments of packings. FIG. 5A depicts an embodiment of a packing 510. Packing 510 is formed in the shape of a ring having an inner surface 511 and an outer surface 512. The packing 510 can be made of braided fibers, such as PBI fibers, or any other suitable material. The diameter of the inner surface 511 can be selected to be slightly larger than the diameter of a shaft and the diameter of the outer surface 512 can be selected to be slightly smaller than a diameter of a seal cavity.

FIGS. 5B and 5C depict an embodiments of a packing 520. The packing 520 can be made from a resilient flexible material, such as PBI braidings, that will allow the packing 520 to be bent from a straight arrangement, such as the one depicted in FIG. 5B, to a ring-shaped arrangement, such as the one depicted in FIG. 5C. Packing 520 can have an inner surface 521 and an outer surface 522. The width between the outer surface 522 and the inner surface 521 may be selected such that, when the packing 520 is bent into a cylindrical tube shape as depicted in FIG. 5C, the diameter of the inner surface 521 is slightly larger than the diameter of a shaft and the outer surface 522 is slightly smaller than a diameter of a seal cavity.

Figure 6:
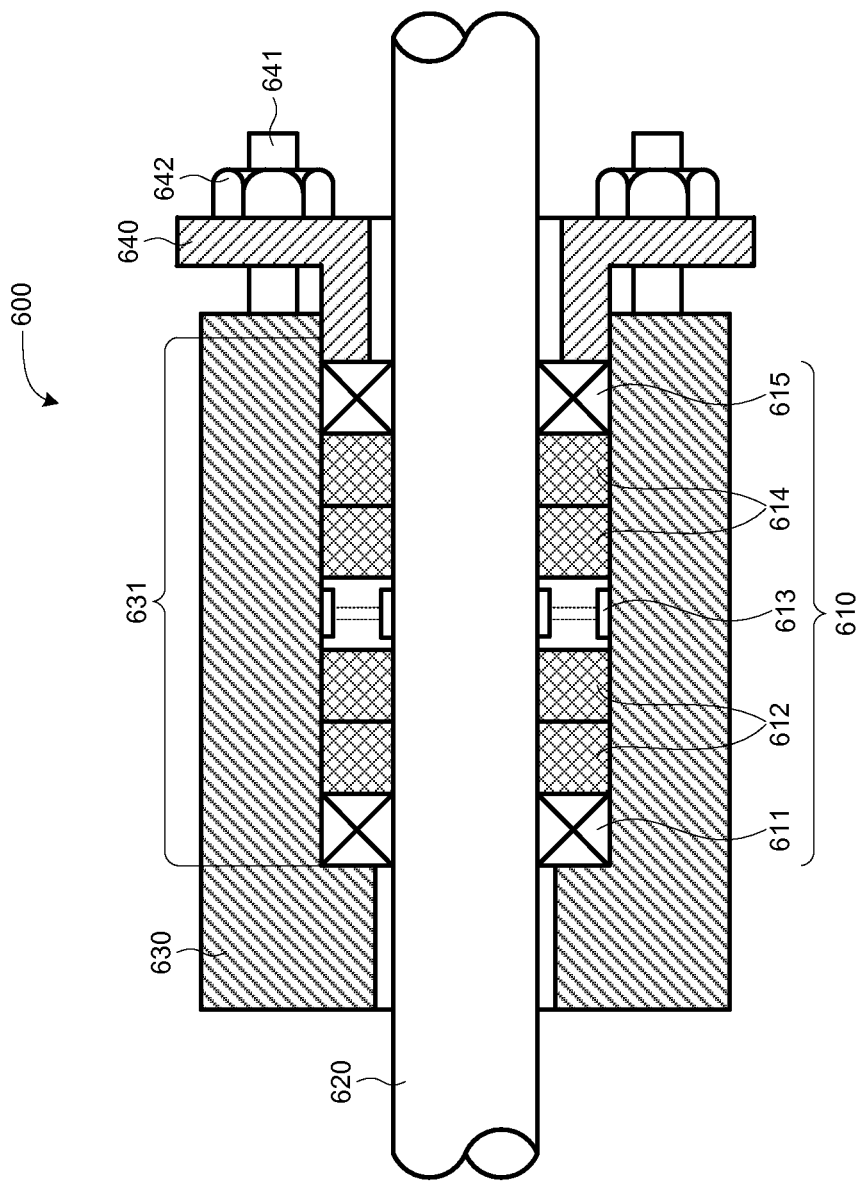
FIG. 6 depicts an embodiment of a shaft support and lubrication system installed on a shaft and located in a housing.

FIG. 6 depicts an embodiment of a system 600 with a shaft support and lubrication system 610 installed on a shaft 620 and located in a housing 630. Housing 630 defines a seal cavity 631 in which the shaft support and lubrication system 610 can be installed. A vise bearing 611 can be placed around shaft 620 and at one end of the seal cavity 631. The vise bearing 611 can be a rigid cylindrical tube, two semi-cylindrical halves of a tube, or any other configuration that can provide structural support for shaft 620. One or more first packings 612 can be placed in the seal cavity 631 next to vise bearing 611. The one or more first packings 612 can be made of a flexible material, such as PBI braidings. A lantern ring 613 may be placed in the seal cavity 631 next to the one or more first packings 612. The lantern ring 613 can be made of a flexible resilient material. The lantern ring 613 can have one or more outer grooves, one or more inner grooves. The lantern ring 613 can also have one or more through holes that run from either the outer surface or the one or more outer grooves of the lantern ring 613 to either the inner surface or the one or more inner grooves of the lantern ring 613. One or more second packings 614 can be placed in the seal cavity 631 next to lantern ring 613. The one or more second packings 614 can be made of a flexible material, such as PBI braidings. A second vise bearing 615 can be placed around shaft 620 and at the other end of the seal cavity 631. The vise bearing 615 can be a rigid cylindrical tube, two semi-cylindrical halves of a tube, or any other configuration that can provide structural support for shaft 620.

The vise bearings 611 and 615 can be configured as sleeve bearings. The vise bearings 611 and 615 can be spaced apart to provide support to the shaft 620 and to lend support to the entire shaft 620. The two vise bearings 611 and 615 can provide the equivalent of a single bearing that runs from the left annular surface of vise bearing 611 to the right surface of vise bearing 615 while preserving a space for the lantern ring 613 and the packings 612 and 614. If the center of downward force exerted by the shaft 620 is located between vise bearing 611 and vise bearing 615, each of the vise bearings 611 and 615 can support a portion of that force. If the center of downward force exerted by the shaft 620 is located outside of the space between vise bearing 611 and vise bearing 615, not only will the vise bearings 611 and 615 support the downward force of the shaft 620 but a torque will also be applied to vise bearings 611 and 615. In the latter case, the spaced apart configuration of the vise bearings 611 and 615 can resist the torque being situated further apart on the lever arm, thereby obtaining a mechanical advantage as situated in touching relation. The spaced apart relation reduces the risk that the torque will deflect the shaft 620 and, therefore, reduces the risk of compromising the sealing conformity of the packings 612 and 614. While a two-bearing solution is depicted, these advantages are gained by, at least the outer two bearings 611 and 615 but might be enhanced by additional bearings at intervals throughout the shaft support and lubrication system 610.

The system 600 can also include a gland follower 640. The gland follower 640 can exert a force in an axial direction on vise bearing 615, causing the shaft support and lubrication system 610 to compress. The gland follower can be attached to the housing and urged axially against vise bearing 615 by torque extended on nuts 642 along bolts 641. The inner diameter of the vise bearings 611 and 615 can be approximately equal to the inner diameter of packings 612 and 614 and the inner diameter of the lantern ring 613. The outer diameter of the vise bearings 611 and 615 can be approximately equal to the outer diameter of packings 612 and 614 and the outer diameter of the lantern ring 613. The rotational motion of the nuts 642 is converted by the meshing of threads on the nuts 642 and the bolts 641 to impart a linear motion axially inward thus converting the torque on the nuts 642 to a linear compressive force axially on the shaft support and lubrication system 610. The gland follower 640 exerts the compressive force on the one or more first and second packings 612 and 614 pressing them inward within the seal cavity 631 into sealing engagement with the shaft 620.

One of the benefits of the system depicted in FIG. 6 is the ease of servicing the shaft support and lubrication system 610 when the lantern ring 613 wears out. When lantern ring 613 wears out, the gland follower 640 can be removed, followed by removal of the second vise bearing 615, the one or more second packings 614, and the worn out lantern ring 613. Once removed, the worn out lantern ring 613 can be replaced with a new lantern ring 613, the same or new one or more second packings 614, and the same or new second vise bearing 615. The gland follower 640 can then be replaced. Such a replacement process is significantly easier than other traditional solutions. For example, some traditional solutions may include a rigid component that includes both a bearing portion and a lantern ring portion in the same rigid component. When the lantern ring portion fails, the rigid component may seize to the shaft making it nearly impossible to remove the rigid component from the shaft without destroying the rigid component, the shaft, or both. The replacement of such a rigid component is prohibitively expensive and may require replacement of expensive parts, such as the shaft itself.

While the preferred embodiment of the invention has been illustrated and described, as noted above, many changes can be made without departing from the spirit and scope of the invention. For example, neither exact dimension of either of the vise bearings nor the number of packings is critical and may be adjusted in accord with the particular application.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A system for providing support and lubrication to a shaft, the system comprising:
   a housing defining a seal cavity, the seal cavity having a diameter;
   a shaft passing through the seal cavity, the shaft having a diameter;
   a first vise bearing and a second vise bearing located around the shaft in the seal cavity, each of the first and second vise bearings being a rigid cylindrical tube, having an inner diameter selected based on the diameter of the shaft, and having an outer diameter based on the diameter of the seal cavity;
   a lantern ring located around the shaft and in the seal cavity between the first vise bearing and the second vise bearing, the lantern ring being a flexible cylindrical tube having an inner diameter selected based on the diameter of the shaft and an outer diameter based on the diameter of the seal cavity, wherein the lantern ring comprises at least two outer grooves ridges on the outer diameter, one or more inner grooves on the inner diameter, and one or more through holes from either the outer diameter or the at least two outer grooves to either the inner diameter or the one or more inner grooves;
   one or more first packings located around the shaft and in the seal cavity between the first vise bearing and the lantern ring, the one or more first packings having an inner diameter selected based on the diameter of the shaft and an outer diameter based on the diameter of the seal cavity; and
   one or more second packings located around the shaft and in the seal cavity between the second vise bearing and the lantern ring, the one or more first packings having an inner diameter selected based on the diameter of the shaft and an outer diameter based on the diameter of the seal cavity.

2. The system of claim 1, further comprising:
   a gland follower attached to the housing and configured to exert a force on the second vise bearing.

3. The system of claim 2, wherein the first vise bearing abuts a portion of the housing, and wherein a force exerted by the gland follower on the second bearing results in a compressive force being applied on the one or more first packings and the one or more second packings.

4. The system of claim 1, wherein the lantern ring is bent from a straight arrangement to a cylindrical arrangement.

5. The system of claim 1, wherein at least one of the one or more first packings and the one or more second packings is bent from a straight arrangement to a cylindrical arrangement.

6. The system of claim 1, wherein at least one of the first and second vise bearings comprises two halves of a cylindrical tube.

7. The system of claim 6, wherein each of the two halves comprise two mating surfaces.

8. The system of claim 7, wherein each of the mating surfaces comprises a centering element configured to align the mating surface with an opposing mating surface.

9. A system for providing support and lubrication to a shaft, the system comprising:
   a housing defining a seal cavity, the seal cavity having a diameter;
   a shaft passing through the seal cavity, the shaft having a diameter;
   a first vise bearing and a second vise bearing located around the shaft in the seal cavity, each of the first and second vise bearings being a rigid cylindrical tube, having an inner diameter selected based on the diameter of the shaft, and having an outer diameter based on the diameter of the seal cavity;
   a lantern ring located around the shaft and in the seal cavity between the first vise bearing and the second vise bearing, the lantern ring being a flexible cylindrical tube having an inner diameter selected based on the diameter of the shaft and an outer diameter based on the diameter of the seal cavity, wherein the lantern ring comprises one or more outer grooves on the outer diameter, at least two inner grooves on the inner diameter of the lantern ring, and one or more through holes from either the outer diameter or the one or more outer grooves to either the inner diameter or the at least two inner grooves;
   one or more first packings located around the shaft and in the seal cavity between the first vise bearing and the lantern ring, the one or more first packings having an inner diameter selected based on the diameter of the shaft and an outer diameter based on the diameter of the seal cavity; and
   one or more second packings located around the shaft and in the seal cavity between the second vise bearing and the lantern ring, the one or more first packings having an inner diameter selected based on the diameter of the shaft and an outer diameter based on the diameter of the seal cavity.

10. The system of claim 9, wherein the lantern ring is bent from a straight arrangement to a cylindrical arrangement.

11. The system of claim 9, wherein at least one of the one or more first packings and the one or more second packings is bent from a straight arrangement to a cylindrical arrangement.

12. The system of claim 9, wherein at least one of the first and second vise bearings comprises two halves of a cylindrical tube.

13. The system of claim 12, wherein each of the two halves comprise two mating surfaces.

14. A system for providing support and lubrication to a shaft, the system comprising:
- a first vise bearing comprising a rigid cylindrical tube, the first vise bearing having an inner diameter and an outer diameter;
- a second vise bearing comprising a rigid cylindrical tube, the first vise bearing having an inner diameter and an outer diameter;
- a lantern ring comprising a flexible cylindrical tube having an inner diameter and an outer diameter, wherein the lantern ring comprises one or more outer grooves on the outer diameter wherein the one or more outer grooves on the outer diameter of the lantern ring comprise at least two outer grooves on the outer diameter of the lantern ring, one or more inner grooves on the inner diameter, and one or more through holes from either the outer diameter or the one or more outer grooves to either the inner diameter or the one or more inner grooves;
- one or more first packings located between the first vise bearing and the lantern ring, the one or more first packings having an inner diameter and an outer diameter; and
- one or more second packings located between the second vise bearing and the lantern ring, the one or more first packings having an inner diameter selected and an outer diameter;
- wherein the first vise bearing, the second vise bearing, the lantern ring, the one or more first packings, and the one or more second packings are aligned coaxially.

15. The system of claim 14, wherein the one or more inner grooves on the inner diameter of the lantern ring comprise at least two inner grooves on the inner diameter of the lantern ring.

16. The system of claim 14, wherein the lantern ring is bent from a straight arrangement to a cylindrical arrangement.

17. The system of claim 14, wherein at least one of the one or more first packings and the one or more second packings is bent from a straight arrangement to a cylindrical arrangement.

18. The system of claim 14, wherein at least one of the first and second vise bearings comprises two halves of a cylindrical tube.

19. The system of claim 18, wherein each of the two halves comprise two mating surfaces.

20. The system of claim 19, wherein each of the mating surfaces comprises a centering element configured to align the mating surface with an opposing mating surface.

* * * * *